US007826932B2

(12) United States Patent
Cargnelli et al.

(10) Patent No.: US 7,826,932 B2
(45) Date of Patent: Nov. 2, 2010

(54) SYSTEMS AND METHODS FOR UPDATING GRAPHICAL REPRESENTATIONS ON MULTIPLE INTERFACE DEVICES

(75) Inventors: Claudio Cargnelli, Ontario (CA); Gabriel Tomsa, Ontario (CA)

(73) Assignee: General Electric Company, Schenectady, NY (US)

( * ) Notice: Subject to any disclaimer, the term of this patent is extended or adjusted under 35 U.S.C. 154(b) by 1318 days.

(21) Appl. No.: 11/009,834

(22) Filed: Dec. 10, 2004

(65) Prior Publication Data
US 2006/0129281 A1 Jun. 15, 2006

(51) Int. Cl.
*H02H 3/00* (2006.01)
*G05D 11/00* (2006.01)
(52) U.S. Cl. .................. 700/292; 700/286; 700/295
(58) Field of Classification Search ................ 700/286, 700/292–295, 22; 702/57, 58
See application file for complete search history.

(56) References Cited

U.S. PATENT DOCUMENTS

| 6,356,422 | B1 * | 3/2002 | Bilac et al. ................. 361/93.1 |
|---|---|---|---|
| 6,621,179 | B1 * | 9/2003 | Howard ........................ 307/38 |
| 6,788,512 | B2 * | 9/2004 | Vicente et al. .............. 700/293 |
| 6,789,103 | B1 * | 9/2004 | Kim et al. .................... 709/203 |
| 6,842,668 | B2 * | 1/2005 | Carson et al. ............... 700/286 |
| 6,909,942 | B2 * | 6/2005 | Andarawis et al. .......... 700/286 |
| 2002/0107749 | A1 * | 8/2002 | Leslie et al. .................. 705/26 |
| 2003/0065582 | A1 * | 4/2003 | Lin .............................. 705/26 |
| 2003/0212513 | A1 * | 11/2003 | Vandevanter et al. .......... 702/57 |
| 2003/0225481 | A1 * | 12/2003 | Sealing et al. .............. 700/286 |

* cited by examiner

*Primary Examiner*—Charles R Kasenge
(74) *Attorney, Agent, or Firm*—Ohlandt, Greeley, Ruggiero & Perle, L.L.P.

(57) ABSTRACT

A switch-gear system having a central controller for operating a plurality of circuit breakers, a first interface device, a second interface device, and an update system in communication with the first and second interface devices is provided. The first interface device can modify a lineup parameter of the plurality of circuit breakers in and display a first graphical representation of the lineup parameter. The second interface device can modify the lineup parameter and display a second graphical representation of the lineup parameter. The update system can save a modification to the lineup parameter at the first or second interface device and to publish the modification to the other of the first or second interface devices so that the first and second graphical representations are identical.

15 Claims, 4 Drawing Sheets

SYSTEMS AND METHODS FOR UPDATING GRAPHICAL REPRESENTATIONS ON MULTIPLE INTERFACE DEVICES

BACKGROUND OF INVENTION

The present disclosure relates to systems and methods for updating graphical representations. More particularly, the present disclosure relates to systems and methods for updating graphical representations running on multiple user interface devices.

Power distribution systems commonly include switch-gear for dividing incoming power to a number of branch circuits. The branch circuits supply power to various equipment (i.e., loads) in the industrial facility. The switch-gear typically includes circuit breakers at the main circuit and in each branch circuit to facilitate protecting equipment within the system. The circuit breakers commonly include supplementary protectors enclosed within the body of the circuit breaker. One common type of supplementary protector is known as an electronic trip unit.

Recently, it has been proposed by the Assignee of the present application to control multiple supplementary protectors in a centralized manner. For example, U.S. application Ser. No. 10/373,679 filed on Feb. 25, 2003 describes a centrally controlled switch-gear system for power distribution systems, the entire contents of which are incorporated by reference herein. Such systems have proven useful at providing integrated protection, monitoring, and control of the switch gear system.

It has been determined that there is a need for systems and methods for updating the graphical representations available at user interface devices running at multiple locations.

BRIEF DESCRIPTION OF THE INVENTION

It is an object of the present disclosure to provide systems and methods for keeping multiple instances of a graphic representation of a physical configuration at different locations in sync with one another.

A switch-gear system is provided. The switch-gear system includes a central controller for operating a plurality of circuit breakers, a first interface device, a second interface device, and an update system in communication with the first and second interface devices. The first interface device can modify a lineup parameter of the plurality of circuit breakers in and display a first graphical representation of the lineup parameter. The second interface device can modify the lineup parameter and display a second graphical representation of the lineup parameter. The update system can save a modification to the lineup parameter at the first or second interface device and to publish the modification to the other of the first or second interface devices so that the first and second graphical representations are identical.

A method for updating graphical representations of switch-gear lineup parameters running on multiple user interfaces in a centrally controlled power distribution system is also provided. The method includes providing at least a first user interface and a second user interface displaying a graphical representation of the switch-gear lineup parameters; changing one or more parameters of the switch-gear lineup parameters at the first user interface; saving the one or more parameters in an update device; and downloading the one or more parameters to the second user interface so that the graphical representation displayed by the second user interface is identical to the graphical representation displayed by the first user interface.

A power distribution system is also provided. The power distribution system includes a central controller, a plurality of circuit breakers, a plurality of modules, a data network, a plurality of interface devices, and an update system. Each module can trip the respective one of the circuit breakers upon receipt of a signal from the central controller. The data network allows communication between the central controller and the modules. The interface devices can modify a lineup parameter of the circuit breakers and can display a graphical representation of the lineup parameter. The update system can save a modification to the lineup parameter at any one of the interface devices and to publish the modification to all remaining interface devices so that the graphical representations on all of the interface devices are identical.

These and other objects and/or advantages of the present disclosure can be appreciated and understood by those skilled in the art from the following detailed description, drawings, and appended claims.

DETAILED DESCRIPTION OF THE INVENTION

Figure 1:
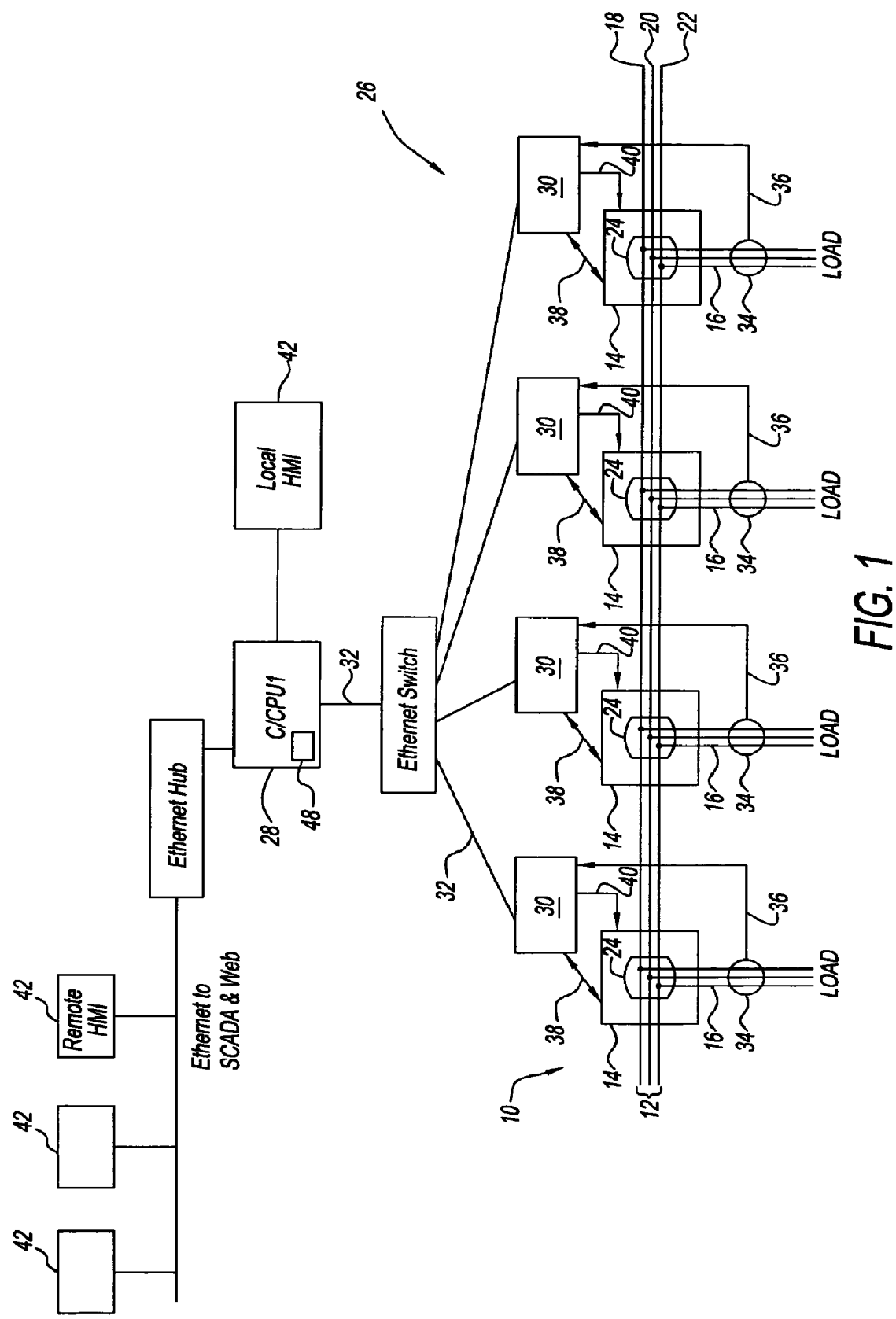
FIG. 1 is a schematic view of an exemplary embodiment of a switch-gear system having an updating system according to the present disclosure.

Referring now to the drawings and in particular to FIG. 1, an exemplary embodiment of a power distribution system 10 according to the present disclosure is illustrated.

Distribution system 10 distributes power from at least one power bus 12 through a number or plurality of circuit breakers 14 to branch circuits 16. Power bus 12 is illustrated by way of example as a three-phase power system having a first phase 18, a second phase 20, and a third phase 22. Each circuit breaker 14 has a set of separable contacts 24 (illustrated schematically). Contacts 24 selectively place power bus 12 in communication with at least one load (also illustrated schematically) on circuit 16.

Power distribution system 10 includes a centrally controlled and fully integrated protection, monitoring, and control switch-gear system 26 (hereinafter "switch-gear"). Switch-gear 26 is configured to control and monitor distribution system 10 from a central controller 28. Controller 28 communicates with a number or plurality of data sample and transmission modules 30 (hereinafter "module") over a data network 32. Network 32 communicates all of the information from all of the modules 30 substantially simultaneously to controller 28.

In this manner, switch-gear 26 can include protection and control schemes that consider the value of electrical signals, such as current magnitude and phase, at one or all circuit breakers 14. Further, switch-gear 26 integrates the protection, control, and monitoring functions of the individual breakers 14 of distribution system 10 in a single, centralized control processor (e.g., controller 28). Switch-gear 26 provides controller 28 with all of a synchronized set of information available through digital communication with modules 30 and circuit breakers 14 on network 32 and provides the controller with the ability to operate these devices based on this complete set of data.

Each module 30 is in communication with one of the circuit breakers 14. Each module 30 is also in communication with at least one sensor 34 sensing a condition of the power in each phase (e.g., first phase 18, second phase 20, third phase 22, and neutral) of bus 12 and/or circuit 16. Sensors 34 monitor a condition of the incoming power in circuits 16 and provide a first signal 36 representative of the condition of the power to module 30.

Module 30 sends and receives one or more second signals 38 to and/or from circuit breaker 14. Second signals 38 can be representative of one or more conditions of breaker 14, such as, but not limited to, a position of separable contacts 24, a spring charge switch status, and others. In addition, module 30 is configured to operate circuit breaker 14 by sending one or more third signals 40 to the breaker to open/close separable contacts 24 as desired.

Since the protection and monitoring algorithms of switch-gear 26 are resident in controller 28, these algorithms can be enabled without requiring hardware or software changes in circuit breaker 14 or module 30. Further, network 32 removes the need for circuit breakers 14 to be hard wired to controller 28. Thus, switch-gear 26 can easily be physically reconfigured such as adding new circuit breakers 14 to the switch-gear.

Switch-gear 26 can also include one or more interface devices 42. For purposes of clarity, switch-gear 26 is illustrated having one interface device 42 local to controller 28 and three interface devices 42 remote from the controller. The one or more lineup parameters of switch-gear 26 can be adjusted and viewed at each interface device 42.

Specifically, each interface device 42 includes a processor or computer (not shown) running an interface application. In the example where interface device 42 is local to controller 28, the interface application can be resident on the controller or on a separate processor. The interface application allows a user to adjust and view the lineup parameters of switch-gear 26. The lineup parameters that can be modified and displayed at interface device 42 can include a one-line diagram of switch-gear 26, an elevation diagram of the switch-gear, a breaker name, maintenance or work notes, currents, voltages, power, energy instantaneous or accumulated values per breaker, alarms or alerts values per breaker or cumulative and others.

Traditional switch-gear are hard wired systems, which allow users to determine the physical configuration of the switch-gear by tracing the hard wires between devices or by viewing a wiring diagram. However, switch-gear 26 of the present disclosure communicates over network 32 instead of the traditional hard wired configuration. Advantageously, the physical configuration of switch-gear 26 can be ascertained by viewing the line-up parameters on interface device 42.

Unfortunately, when a user modifies the lineup parameters in the interface application resident one of the interface devices 42, the other interface devices will not be aware of the changes. The modification could be as simple as changing the breaker names or as critical as altering the one-line diagram or the elevation diagram that reflects a physical change in the lineup.

Figure 2:
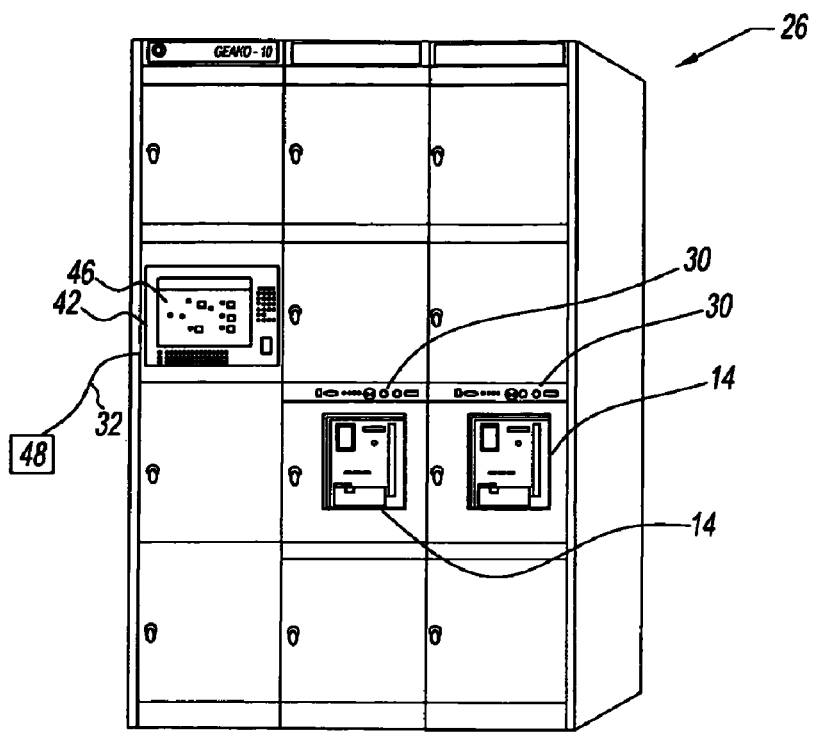
FIG. 2 illustrates a first physical configuration of the switch-gear of FIG. 1.
Figure 3:
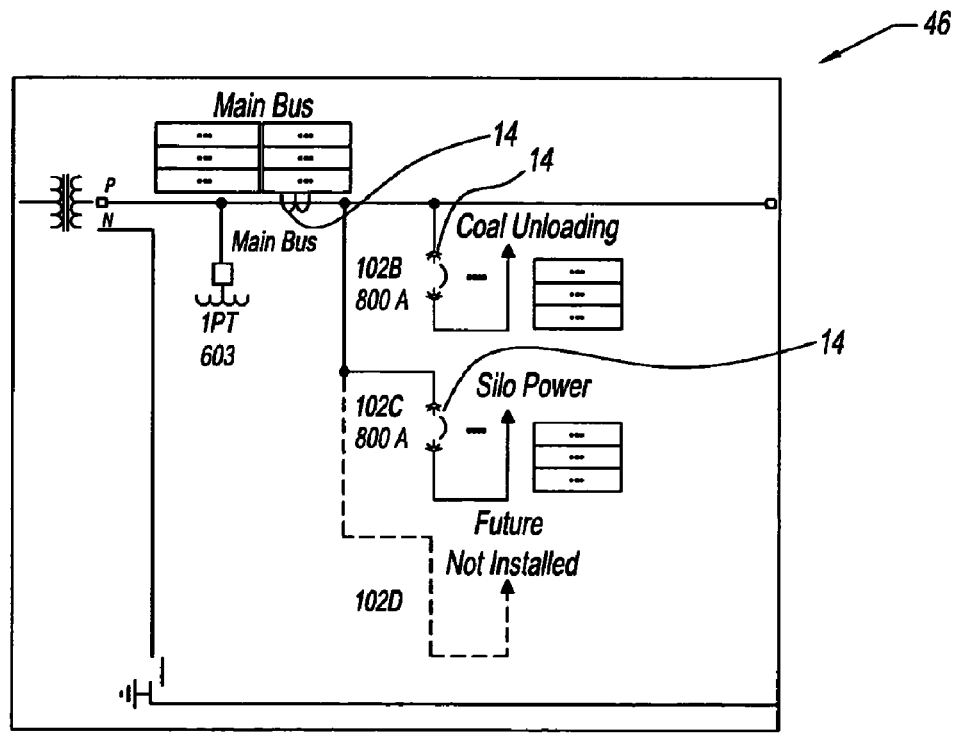
FIG. 3 is a graphical representation of the first physical configuration.
Figure 4:
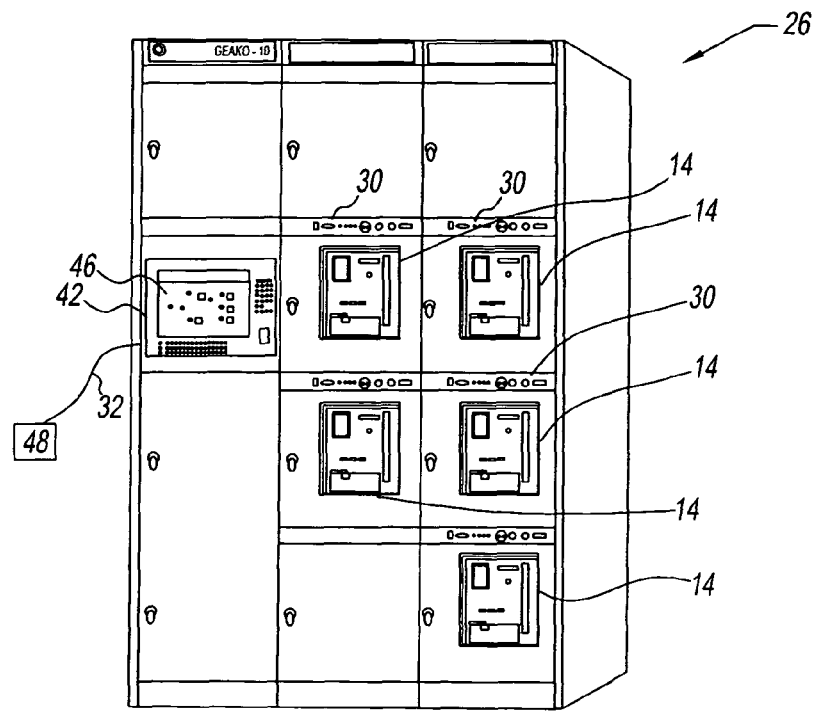
FIG. 4 illustrates a second physical configuration of the switch-gear of FIG. 1.
Figure 5:
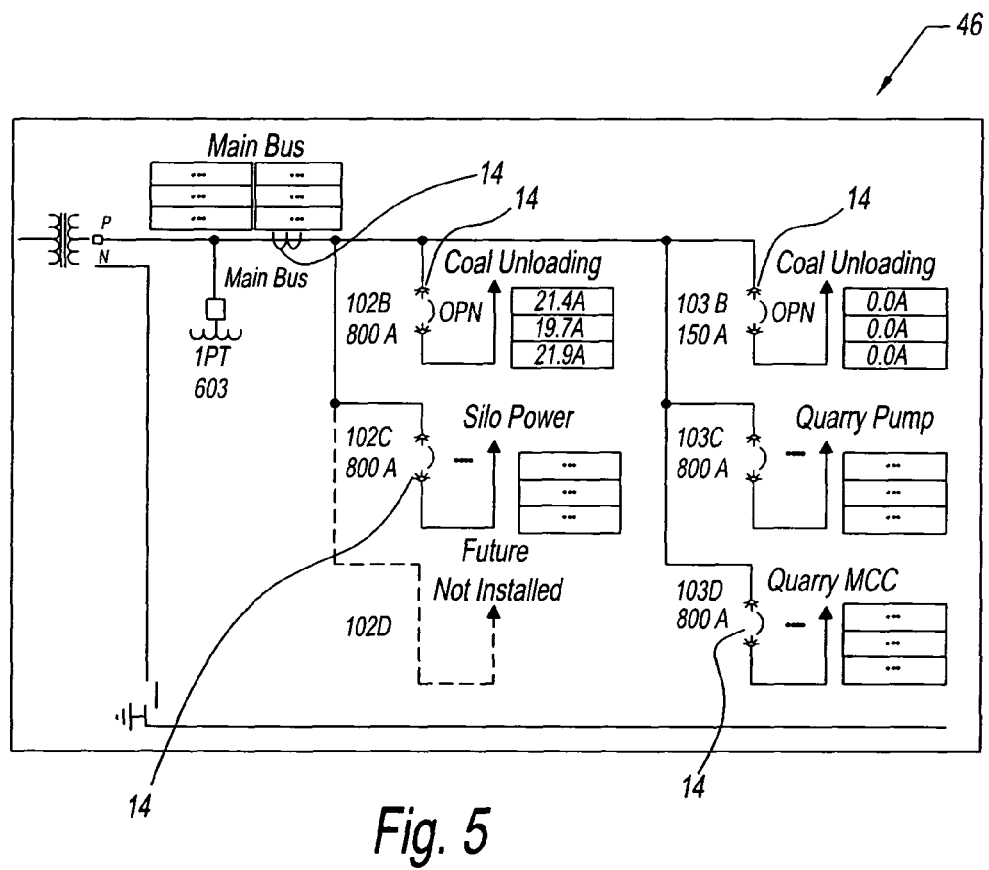
FIG. 5 is a graphical representation of the second physical configuration.

An example modification to switch-gear 26 is illustrated with simultaneous reference to FIGS. 2 through 5. A first physical configuration of switch-gear 26 having two circuit breakers 14 is shown in FIG. 2 and a second physical configuration of the switch-gear, after modification to five circuit breakers, is shown in FIG. 4. A graphical representation 46 of the lineup parameters of the two breaker switch-gear 26 (FIG. 2) is shown in FIG. 3. A graphical representation 46 of the lineup parameters of the five breaker switch-gear 26 (FIG. 4) is shown in FIG. 5. In this example, interface device 42 is local to controller 28.

Switch-gear 26 includes an update system 48 for updating graphical representation 46 running on multiple interface devices 42. Interface devices 42 are in electrical communication with update system 48 via network 32. Update system 48 can save, automatically or on demand, changes made to graphical representation 46 at any of the interface devices 42 and can publish, automatically or on demand, these changes to the remaining interface devices. In this manner, update system 48 ensures that graphical representation 46 on all of the interface devices 46 are identical to one another.

Figure 6:
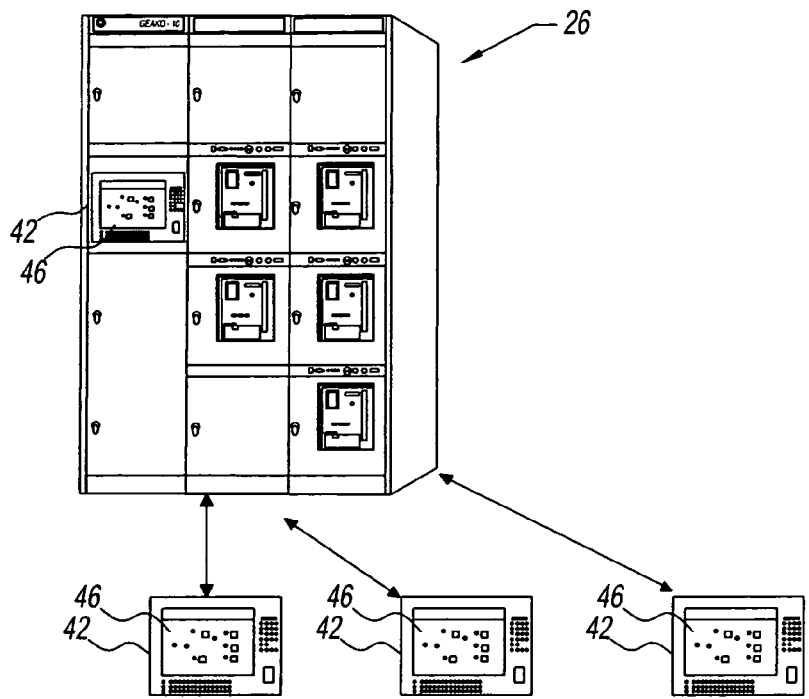
FIG. 6 is a schematic view of the second physical configuration of the switch-gear after updating each of the interface devices.

In an example of an on demand system, individuals using any interface device 42 can check for new changes present in update system 48, and can download these changes to update their interface device as shown in FIG. 6. Alternately, it is contemplated by the present disclosure for the checking and/or downloading of changes in update system 48 to interface devices 42 to occur automatically, namely as changes are made.

In the exemplary embodiment of the present disclosure illustrated in FIG. 1, update system 48 can be a flash memory resident on controller 28. Of course, it is contemplated by the present disclosure for update system 48 to be resident on another computer or processor in communication with interface devices 42 via network 32.

Figure 7:
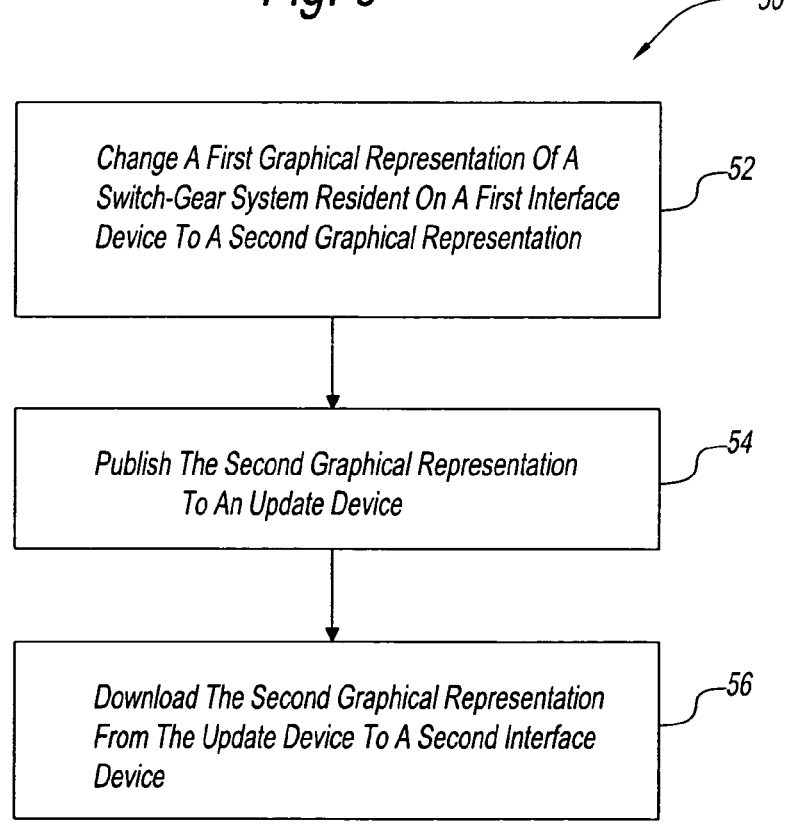
FIG. 7 is a flow diagram of an updating system according to the present disclosure.

Referring now to FIG. 7, an exemplary embodiment of a method 50 of updating multiple instances of a graphical representation of the lineup parameters of switch-gear 26 is shown. Method 50 includes a first step 52, a second step 54, and a third step 56. In first step 52, a user can change a lineup parameter resident on a first interface device. Once the change is complete, the changed or updated graphical representation is saved to an update device in the second step 54. Finally, the changed or updated graphical representation can be published or downloaded from the update device to a second interface device in the third step 56.

In one exemplary embodiment of the present disclosure, the changed or updated graphical representation can be published to the update device automatically during second step 54. Alternately, the changed or updated graphical representation can be manually published by the user during second step 54 (i.e., published on demand). Similarly, the changed or updated graphical representation can be manually and/or automatically downloaded from the update device to one or more second interfaces during third step 57.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A switch-gear system, comprising:
   a central controller for operating a plurality of circuit breakers;
   a first interface device running a first interface application, said first interface device being configured to modify a lineup parameter of said plurality of circuit breakers in said first interface application and to display a first graphical representation of said lineup parameter;
   a second interface device running a second interface application, said second interface device being configured to modify said lineup parameter in said second interface application and to display a second graphical representation of said lineup parameter; and
   an update system in communication with said first and second interface applications and said central controller, said update system being configured to save a modification to said lineup parameter at said first or second interface device and to publish said modification to the other of said first or second interface devices so that said first and second graphical representations are identical.

2. The switch-gear system as in claim 1, wherein said lineup parameter is selected from the group consisting of a one-line diagram of switch-gear, an elevation diagram of the switch-gear, a breaker name, maintenance or work notes, currents, voltages, power, energy instantaneous or accumulated values per breaker, alarms or alerts values per breaker or cumulative, and any combinations thereof.

3. The switch-gear system as in claim 1, wherein said update system is configured to save said modification automatically or on demand.

4. The switch-gear system as in claim 1, wherein said update system is configured to publish said modification automatically or on demand.

5. The switch-gear system as in claim 1, wherein said update system comprises a flash memory resident on said central controller.

6. A method for updating graphical representations of switch-gear lineup parameters running on multiple user interfaces in a centrally controlled power distribution system, the method comprising:
   providing at least a first user interface and a second user interface displaying a graphical representation of the switch-gear lineup parameters;
   changing one or more parameters of the switch-gear lineup parameters at said first user interface;
   saving said one or more parameters in an update device in communication with the centrally controlled power distribution system; and
   publishing, by said update device, said one or more parameters to said second user interface so that said graphical representation displayed by said second user interface is identical to said graphical representation displayed by said first user interface.

7. The method as in claim 6, further comprising downloading said one or more parameters to a plurality of user interfaces so that said graphical representation displayed by all of said plurality of user interfaces are identical to said graphical representation displayed by said first and second user interfaces.

8. The method as in claim 6, wherein said one or more parameters is a parameter selected from the group consisting of a one-line diagram of switch-gear, an elevation diagram of the switch-gear, a breaker name, maintenance or work notes, currents, voltages, power, energy instantaneous or accumulated values per breaker, alarms or alerts values per breaker or cumulative, and any combinations thereof.

9. The method as in claim 6, wherein the step of saving said one or more parameters in said update device occurs automatically or on demand.

10. The method as in claim 6, wherein the step of downloading said one or more parameters in said update device occurs automatically or on demand.

11. A power distribution system comprising:
    a central controller;
    a plurality of circuit breakers;
    a plurality of modules, each module of said plurality of modules sensing one or more conditions at a respective one of said plurality of circuit breakers, each module being configured to trip said respective one of said plurality of circuit breakers upon receipt of a signal;
    a data network for communicating said signal and said one or more conditions between said central controller and said plurality of modules;
    a plurality of interface devices each running an interface application, said plurality of interface devices being in communication with said central controller and said plurality of modules and being configured to modify a lineup parameter of said plurality of circuit breakers and to display a graphical representation of said lineup parameter; and
    an update system in communication with said interface applications, said update system being configured to save a modification to said lineup parameter at any one of said plurality of interface devices and to publish said modification to all remaining of said plurality of interface devices so that said graphical representation on each of said plurality of interface devices is identical.

12. The power distribution system as in claim 11, wherein said lineup parameter is selected from the group consisting of a one-line diagram of switch-gear, an elevation diagram of the switch-gear, a breaker name, maintenance or work notes, currents, voltages, power, energy instantaneous or accumulated values per breaker, alarms or alerts values per breaker or cumulative, and any combinations thereof.

13. The power distribution system as in claim 11, wherein said update system is configured to save said modification automatically or on demand.

14. The power distribution system as in claim 11, wherein said update system is configured to publish said modification automatically or on demand.

15. The power distribution system as in claim 11, wherein said update system comprises a flash memory resident on said central controller.

* * * * *